No. 651,988. Patented June 19, 1900.
E. R. BUTTS.
WIND BREAK FOR GRAIN SEEDERS.
(Application filed Feb. 27, 1900.)
(No Model.) 2 Sheets—Sheet 1.
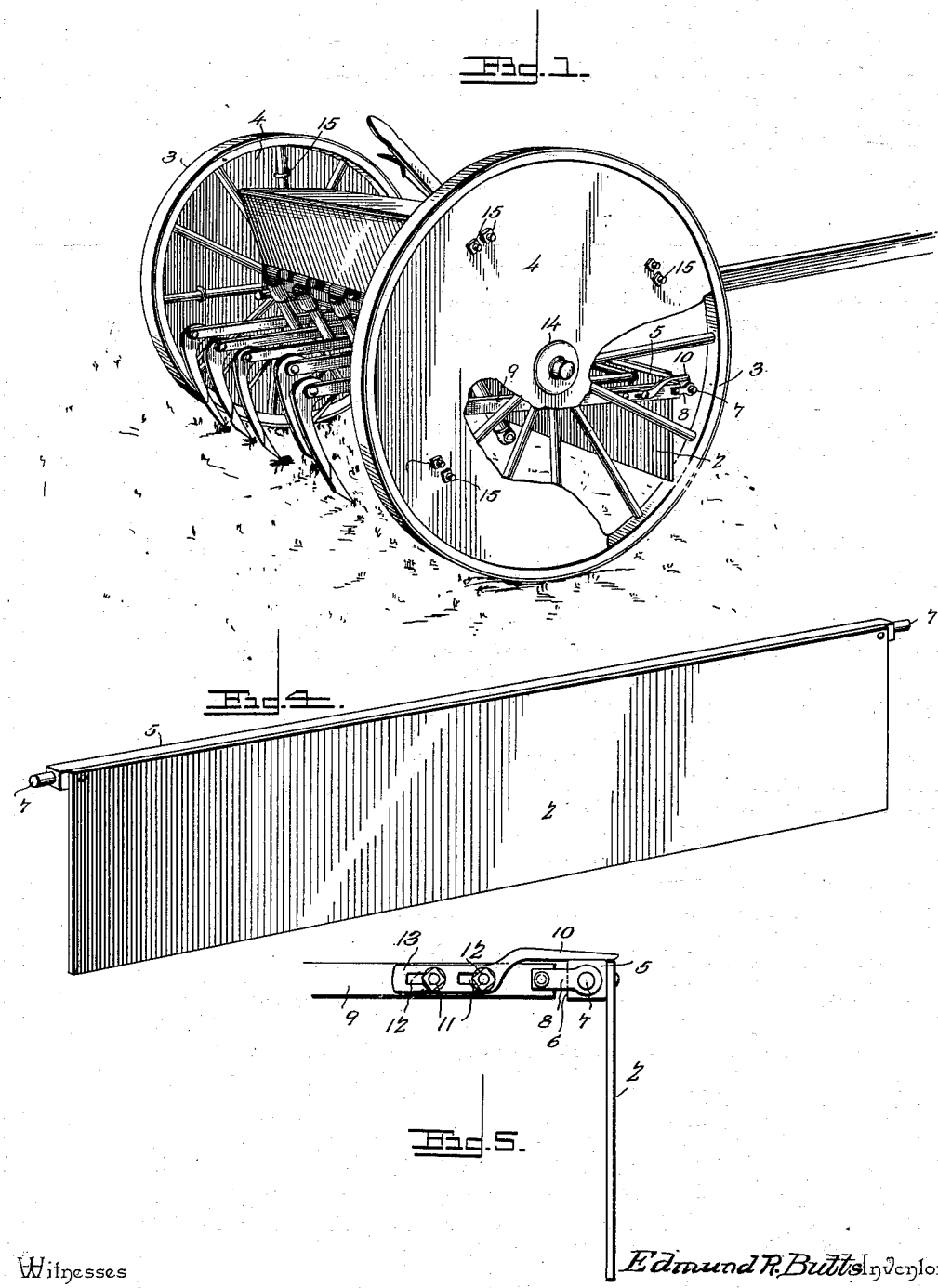
Witnesses
E. F. Stewart
J. W. Garner
By his Attorneys,
C. A. Snow & Co.
Edmund R. Butts, Inventor

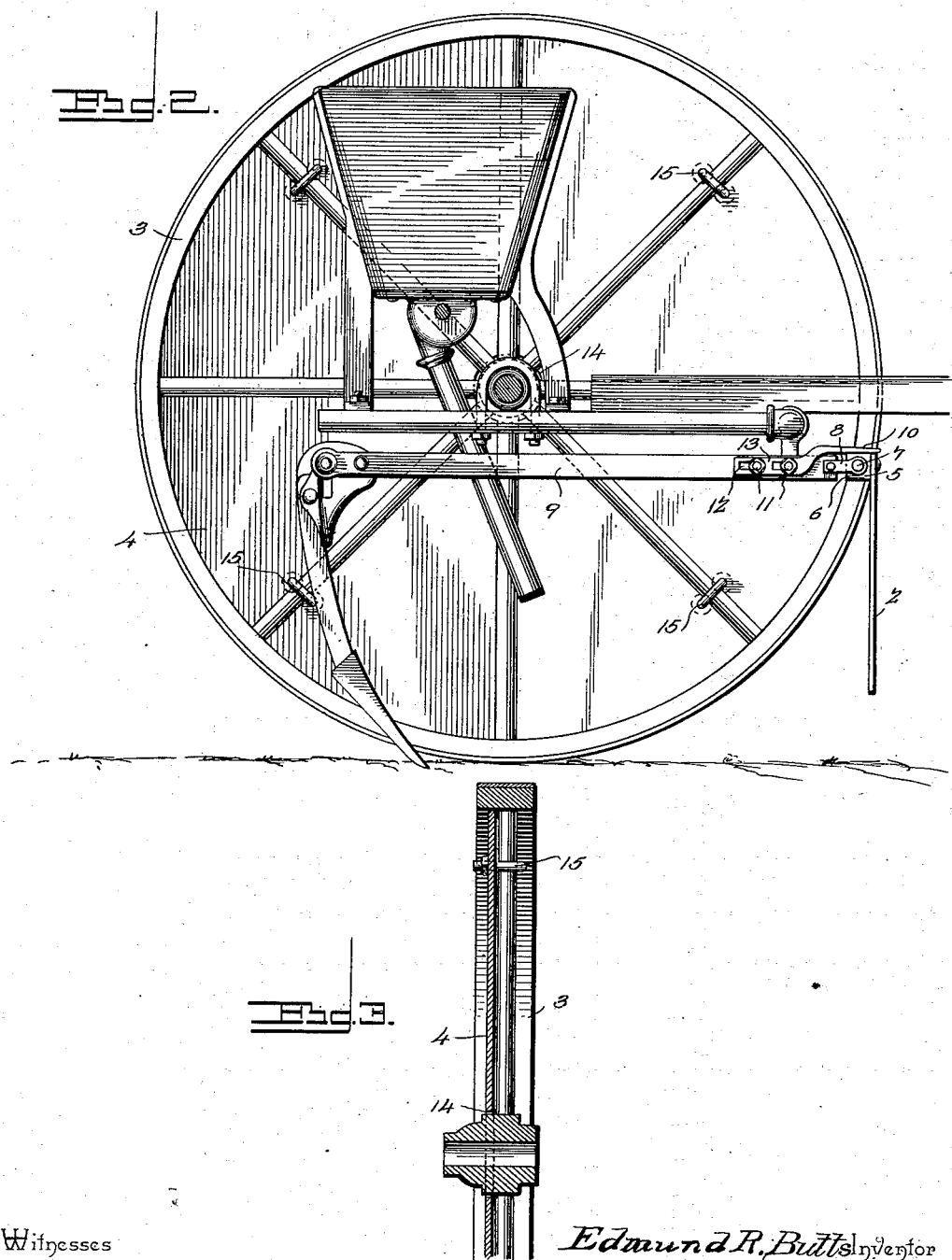

UNITED STATES PATENT OFFICE.

EDMUND RANDEL BUTTS, OF OBERON, NORTH DAKOTA.

WIND-BREAK FOR GRAIN-SEEDERS.

SPECIFICATION forming part of Letters Patent No. 651,988, dated June 19, 1900.

Application filed February 27, 1900. Serial No. 6,701. (No model.)

*To all whom it may concern:*

Be it known that I, EDMUND RANDEL BUTTS, a citizen of the United States, residing at Oberon, in the county of Benson and State of North Dakota, have invented a new and useful Wind-Break for Grain-Seeders, of which the following is a specification.

My invention relates to improvements in wind breaks or screens for grain and grass seeders, the object of my invention being to provide improved wind-breaks which are adapted to be readily attached to grain and grass seeding machines to prevent the wind from interfering with the efficient action thereof and from irregularly scattering the seeds while they are being sown.

My invention consists in the combination, with a seeding-machine, of a wind screen or break hinged or pivoted thereto and disposed across the front side thereof between the wheels, and a spring to normally support said screen in an operative position and permit the same to be folded under the seeder.

My invention further consists in a screen having an angular pivotal member and adapted to be attached to a seeding-machine, in combination with a bearing-spring adapted to engage said angular member and thereby support said screen, while permitting the same to be folded under the seeding-machine.

My invention further consists in a screen adapted to be attached to a wheel to cover the spoked portion thereof and provided with means for detachably securing the same to the spokes of a wheel.

My invention further consists in the peculiar construction and combination of devices hereinafter fully set forth, and pointed out in the claims.

In the drawings, Figure 1 is a perspective view of a seeding-machine provided with wind breaks or screens embodying my improvements. Fig. 2 is a side elevation of the same with the near wheel removed. Fig. 3 is a vertical sectional view through a portion of one of the wheels, showing a screen or wind-break attached thereto. Fig. 4 is a detail perspective view of the front screen or break. Fig. 5 is a detail side elevation of the same and of the means for attaching the break to the seeding-machine.

The seeding-machine 1 is of the usual or any preferred construction and forms no part of my present improvements.

In the embodiment of my invention I employ a screen or wind-break 2, which is arranged transversely across the seeding mechanism in advance thereof and between the supporting-wheels 3 of the seeder, and I also employ screens or wind-breaks 4, which are adapted to be attached directly to the wheels, thereby effectually screening the seeding mechanism from the action of the wind and preventing the seeds as they fall from the seed-spouts from being irregularly blown about by the wind before reaching the ground.

I construct the front screen 2 of any suitable sheet metal, preferably iron or steel, and attach the same at its upper side to a shaft 5, which forms the pivotal support therefor. The said shaft may be either rectangular in cross-section, as here shown, to form rectangular bearing-faces 6, or said bearing-faces may be formed only near the ends of said shaft, at the inner ends of the spindles 7 thereof. Said spindles are journaled in bracket-arms 8, which, as here shown, are secured to and project forward from the front ends of the beams 9 of the seed-covering devices; but in some forms of seeding-machines now in common use it may be found preferable to attach said bracket-arms 8 to the frame of the seeder instead of to the beams of the seed-covering devices, and I do not therefore limit myself in this particular. The said screen 2 when in operative position is disposed transversely with reference to the seeding mechanism and across the front thereof and is adapted to hang in a vertical position between the wheels 3 of the seeding-machine, as shown, and to be folded rearward under the seeding mechanism when it is not necessary to employ said screen. Springs 10 are employed to bear upon the angular faces 6, and, as here shown, said springs are secured to the beams 9 of the seed-coverers by means of bolts 11, which operate in longitudinal slots 12, with which rearward-extending arms 13 of said springs are provided. It will be understood from the foregoing and by reference to Figs. 2 and 5 of the drawings that the said springs are thus adjustably attached to the seeding-machine and adapted to be moved lengthwise with reference to the pivotal joint or connection of the front screen, so that the tension of said springs on the angular faces of the pivotal connection of the screen may be varied as may be required. It will be further understood that said springs by bearing upon said faces of the screen not only support the latter under normal conditions when the same is vertically disposed and in operative position on the seeding-machine, but also support the same when it is folded or turned back rearwardly and lies in a horizontal position under the beams of the seed-coverers.

It will be understood that when the screen 2 is attached to the frame of the seeding-machine instead of to the beams of the seed-coverers, as here shown, the springs 10 will be also attached to the sides of the frame, and I do not therefore limit myself in this particular. Neither do I desire to limit myself to the precise construction of the springs here shown, as it is evident that other forms of springs may be employed to support and hold the screen without departing from the spirit of my invention.

The wheel-screens or wind-breaks 4 are adapted to fit within the rims of the wheels, are preferably made of sheet metal, and are provided with central openings 14 to clear the hubs of the wheels. Said screens or wind-breaks 4 are provided with clip-bolts 15, which are adapted to secure the same to the spokes of the wheels and to permit said screens or wind-breaks to be readily removed from the wheels when it is not desired to employ them.

The screens 4 being secured directly to the wheels and the screen 2 being disposed between the wheels and in advance of the seeding mechanism, said screens 2 and 4 effectually house the seed-spouts and covering devices on three sides and preserve the seeds as they fall from the seed-spouts from being irregularly blown about by the wind.

Having thus described my invention, I claim—

1. In a seeding-machine, a wind-break or screen pivotally connected thereto and adapted to be disposed vertically in advance of the seed-spouts and to be folded rearward under the machine, substantially as described.

2. In a seeding-machine, the combination with a pivoted wind-screen and supports therefor, of a bearing-spring to secure said screen in operative position and permit the same to be folded or turned under the frame of the seeding-machine, substantially as described.

3. A wind-screen for seeding-machines, having supporting brackets or arms in which it is pivoted said arms or brackets being adapted to be attached to the seeding-machine, and the springs to bear upon the pivots of said screen, for the purpose set forth, substantially as described.

4. In a seeding-machine, the combination of a pivoted wind break or screen having its pivots provided with angular bearing-faces, in combination with tension-springs to engage said bearing-faces, substantially as described.

5. In a seeding-machine, the combination of a pivoted wind break or screen having its pivots provided with angular bearing-faces, in combination with tension-springs to engage said bearing-faces, and means to regulate the tension of said springs, substantially as described.

6. A seeding-machine having a wind-screen disposed transversely between the wheels in advance of the seed-spout and screens secured to the wheels and covering the spaces between the spokes thereof, substantially as described.

In testimony that I claim the foregoing as my own I have hereto affixed my signature in the presence of two witnesses.

EDMUND RANDEL BUTTS.

Witnesses:
DAVID WOOD,
NIELS P. PETERSEN.